US011636144B2

(12) United States Patent
Yamasaki et al.

(10) Patent No.: US 11,636,144 B2
(45) Date of Patent: Apr. 25, 2023

(54) CLUSTER ANALYSIS METHOD, CLUSTER ANALYSIS SYSTEM, AND CLUSTER ANALYSIS PROGRAM

(71) Applicant: AIXS, INC., Tokyo (JP)

(72) Inventors: Kunitoshi Yamasaki, Tokyo (JP); Ryuichi Hosoya, Tokyo (JP)

(73) Assignee: AIXS, INC., Tokyo (JP)

( * ) Notice: Subject to any disclaimer, the term of this patent is extended or adjusted under 35 U.S.C. 154(b) by 0 days.

(21) Appl. No.: 17/419,616

(22) PCT Filed: May 15, 2020

(86) PCT No.: PCT/JP2020/019406
§ 371 (c)(1),
(2) Date: Jun. 29, 2021

(87) PCT Pub. No.: WO2020/235468
PCT Pub. Date: Nov. 26, 2020

(65) Prior Publication Data
US 2022/0043851 A1  Feb. 10, 2022

(30) Foreign Application Priority Data
May 17, 2019  (JP) .................... PCT/JP2019/019715

(51) Int. Cl.
*G06F 16/00* (2019.01)
*G06F 16/35* (2019.01)
(Continued)

(52) U.S. Cl.
CPC .......... *G06F 16/358* (2019.01); *G06F 16/313* (2019.01); *G06F 16/355* (2019.01); *G06V 30/40* (2022.01)

(58) Field of Classification Search
None
See application file for complete search history.

(56) References Cited

U.S. PATENT DOCUMENTS 6,038,574 A * 3/2000 Pitkow .................... G06F 16/30
707/999.102
6,154,213 A * 11/2000 Rennison ................ G06F 16/34
715/854
(Continued)

FOREIGN PATENT DOCUMENTS

JP   H07-129593   5/1995
JP   2005-092443   4/2005
(Continued)

OTHER PUBLICATIONS

Iezzi, Domenica Fioredistella. "Centrality measures for text clustering." Communications in Statistics-Theory and Methods 41, No. 16-17 (2012): 3179-3197. (Year: 2012).*
(Continued)

*Primary Examiner* — Polina G Peach
(74) *Attorney, Agent, or Firm* — Hamre, Schumann, Mueller & Larson, P.C.

(57) ABSTRACT

A server 4 executes a similarity calculation step (S2) of calculating similarity between content of one document and content of another document, a cluster classification step (S3) of generating a network in which a document is set as a node based on calculated similarity and similar nodes are connected by an edge, and performing classification based on similar documents, a first index calculation step (S4) of calculating a first index indicating centrality of a document in the network, a second index calculation step (S5) of calculating a second index that is different from the first index in the network and indicates importance of a document, and a display data generation step (S6) of generating, regarding a document, first display data indicating the network by an expression of a size of an object of a node according to the first index, an expression of a gauge having a shape corresponding to a shape of the object according to the second index and a length of the gauge, an expression (Continued)

according to a type of the cluster, and an expression according to magnitude of similarity between documents.

15 Claims, 7 Drawing Sheets

(51) Int. Cl.
*G06F 16/31* (2019.01)
*G06V 30/40* (2022.01)
*G06F 16/30* (2019.01)

(56) References Cited

U.S. PATENT DOCUMENTS

| | | | | |
|---|---|---|---|---|
| 6,256,648 | B1* | 7/2001 | Hill | G06F 16/904 |
| | | | | 715/234 |
| 6,298,174 | B1* | 10/2001 | Lantrip | G06K 9/6253 |
| | | | | 382/305 |
| 7,251,637 | B1* | 7/2007 | Caid | G06K 9/4623 |
| | | | | 706/15 |
| 8,122,026 | B1* | 2/2012 | Laroco, Jr. | G06F 16/93 |
| | | | | 707/730 |
| 8,126,892 | B2* | 2/2012 | Chakravarthy | G06F 16/907 |
| | | | | 707/705 |
| 8,229,948 | B1* | 7/2012 | Ershov | G06F 16/9535 |
| | | | | 707/765 |
| 8,701,048 | B2* | 4/2014 | Borchardt | G06F 3/04815 |
| | | | | 715/848 |
| 9,436,760 | B1* | 9/2016 | Tacchi | G06F 16/9024 |
| 9,710,544 | B1* | 7/2017 | Smith | G06F 16/36 |
| 9,836,183 | B1* | 12/2017 | Love | G06F 16/904 |
| 9,911,211 | B1* | 3/2018 | Damaraju | G06F 16/904 |
| 10,956,790 | B1* | 3/2021 | Victoroff | G06K 9/00483 |
| 11,113,327 | B2* | 9/2021 | Singh | G06F 16/338 |
| 2006/0242190 | A1* | 10/2006 | Wnek | G06F 16/367 |
| 2008/0052378 | A1 | 2/2008 | Matsuyama et al. | |
| 2009/0043797 | A1* | 2/2009 | Dorie | G06F 16/355 |
| | | | | 707/999.102 |
| 2009/0169110 | A1* | 7/2009 | Masuyama | G06F 16/31 |
| | | | | 382/198 |
| 2009/0292526 | A1* | 11/2009 | Harari | G06F 40/205 |
| | | | | 704/9 |
| 2009/0296600 | A1* | 12/2009 | Canright | H04L 41/12 |
| | | | | 370/254 |
| 2010/0106752 | A1* | 4/2010 | Eckardt, III | G06F 16/338 |
| | | | | 715/854 |
| 2010/0332475 | A1* | 12/2010 | Birdwell | G06F 16/24578 |
| | | | | 707/E17.014 |
| 2011/0060983 | A1* | 3/2011 | Cai | G06F 16/9562 |
| | | | | 715/254 |
| 2011/0231129 | A1* | 9/2011 | Yanai | H01L 22/20 |
| | | | | 702/81 |
| 2011/0295773 | A1* | 12/2011 | Fisher | G06Q 30/0631 |
| | | | | 707/769 |
| 2014/0059089 | A1* | 2/2014 | Bryden | G06F 16/21 |
| | | | | 707/803 |
| 2014/0297690 | A1 | 10/2014 | Osoekawa et al. | |
| 2015/0066933 | A1* | 3/2015 | Kolodziej | G06F 16/248 |
| | | | | 707/737 |
| 2016/0048556 | A1* | 2/2016 | Kelly | G06Q 10/10 |
| | | | | 707/767 |
| 2016/0335249 | A1* | 11/2016 | Kano | G06F 40/289 |
| 2017/0277998 | A1* | 9/2017 | Knight | G06F 16/35 |
| 2017/0308525 | A1* | 10/2017 | Koutrika | G06F 40/289 |
| 2017/0351752 | A1* | 12/2017 | Meehan | G06F 16/2465 |
| 2019/0386995 | A1* | 12/2019 | Chafe | G06Q 20/065 |
| 2020/0089802 | A1* | 3/2020 | Ronen | G06V 40/16 |

FOREIGN PATENT DOCUMENTS

| | | |
|---|---|---|
| JP | 2008-052494 | 3/2008 |
| JP | 2008-059442 | 3/2008 |
| JP | 2009-093564 | 4/2009 |
| JP | 2014-191757 | 10/2014 |
| JP | 2018-018118 | 2/2018 |

OTHER PUBLICATIONS

International Search Report issued in International Application No. PCT/JP2020/019406, dated Aug. 18, 2020, 5 pages w/translation.
Written Opinion of the International Searching Authority issued in International Application No. PCT/JP2020/019406, dated Aug. 18, 2020, 3 pages.
Xu, Yangbing, "Research on Scientific Document Clustering and Topic Evolution Based on Citation Networks" Zhejiang University of Finance and Economics, Master Thesis, Dec. 2018, 56 pages—Abstract—pp. 7-9 (III-V).
Office Action issued in corresponding Chinese Patent Application No. 202080005909.X, dated Sep. 24, 2021, 11 pages w/translation.
Seyednaser Nourashrafeddin, et al., "A Visual Approach for Interactive Keyterm-Based Clustering", ACM Transactions an Interactive Intelligent Systems, vol. 8, No. 1, Article 6, Feb. 2018, pp. 6:1-6:35.
Extended European Search Report issued in corresponding European Patent Application No. 20810352.3, dated Feb. 21, 2022, 9 pages.

* cited by examiner

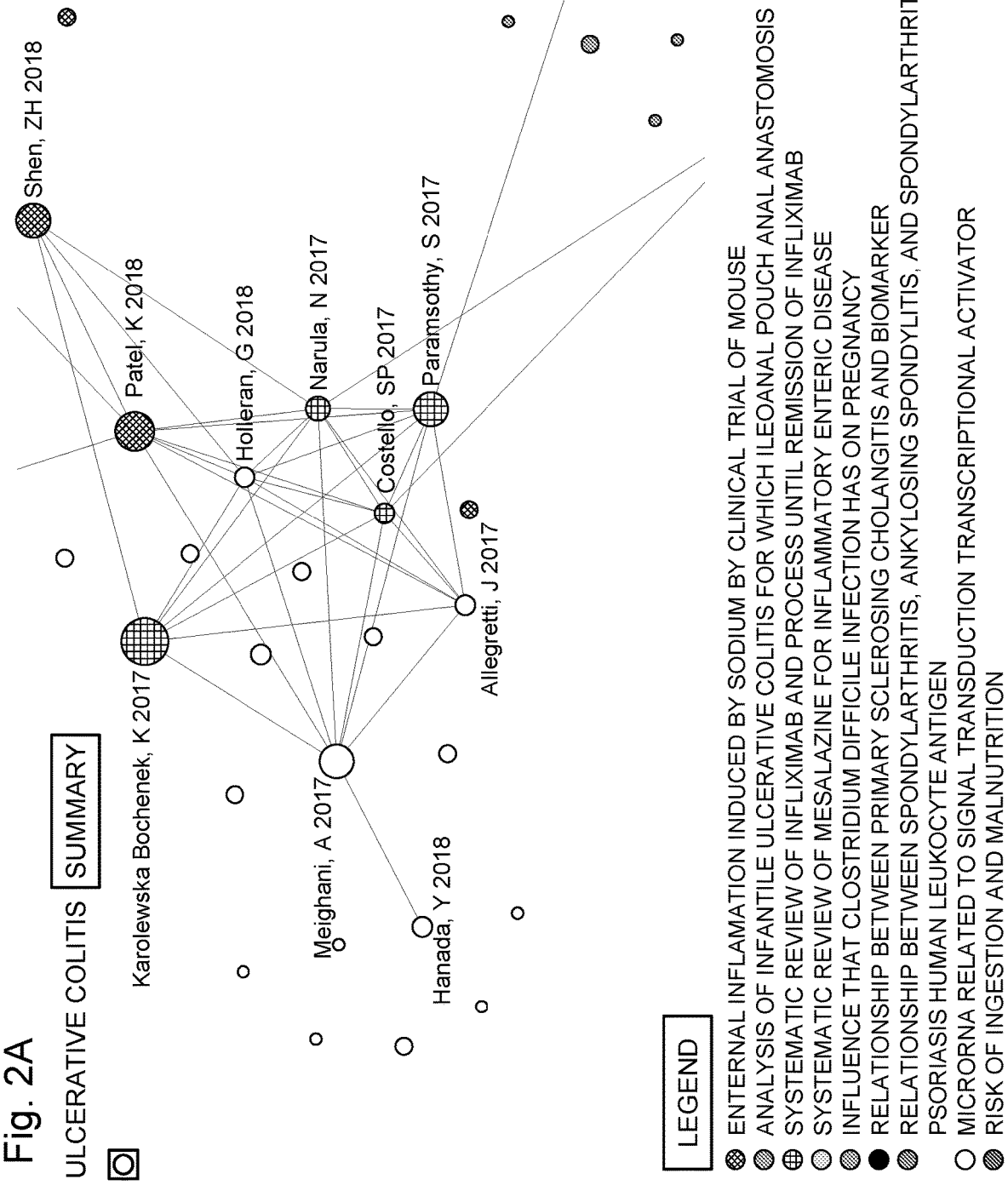

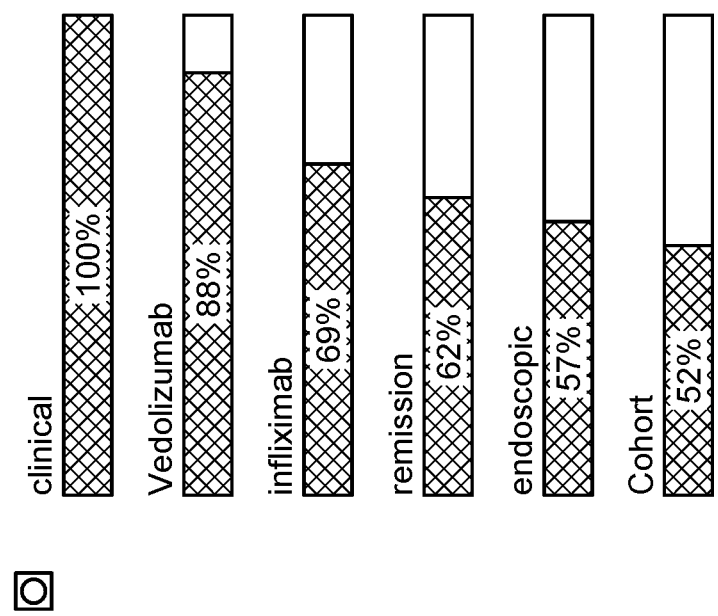

CLUSTER ANALYSIS METHOD, CLUSTER ANALYSIS SYSTEM, AND CLUSTER ANALYSIS PROGRAM

TECHNICAL FIELD

The present invention relates to a cluster analysis method, a cluster analysis system, and a cluster analysis program for classifying a plurality of documents into clusters according to the content of the documents and generating display data indicating a relationship of the documents.

BACKGROUND ART

Conventionally, in a case of analyzing a large number of documents such as academic papers and documents, a person has read the documents and classified the documents into pieces of content or created summaries. The analysis by a person takes time, and, in a case where a plurality of people perform analysis, there is a tendency that the accuracy of classification and summary creation varies depending on the experience and knowledge of the workers.

Further, complicated and highly specialized documents such as an academic paper require a high degree of expertise to understand the content. However, there is a demand that those who do not have such specialized knowledge easily acquire, understand, and utilize latest information.

For example, a cluster analysis method in which morphological analysis is performed on a technical document retrieved by concept search, a weight is added to each word obtained from the morphological analysis, each technical document is vectorized, and technical documents having close vector directions are grouped into one cluster has been proposed (for example, Patent Literature 1).

Such a technique, which allows information to be classified into clusters, is not sufficient for understanding of a relationship between documents, a relationship between clusters, or the like.

CITATION LIST

Patent Literature

Patent Literature 1: JP 2005-92443 A

SUMMARY OF INVENTION

Technical Problem

An object of the present invention is to provide a cluster analysis method, a cluster analysis system, and a cluster analysis program which allow understanding of the gist of a large number of documents in a shorter time efficiently by enabling classification of a large number of documents, particularly an immense number of documents, into clusters including similar documents and a bird's eye view of a relationship between the documents.

Solution to Problem

That is, the present invention is a cluster analysis method in which a computer classifies a plurality of documents into clusters according to content of the documents and generates display data indicating a relationship between documents. The cluster analysis method includes a similarity calculation step of calculating similarity between content of one document and content of another document, a cluster classification step of generating a network in which a document is set as a node based on calculated similarity and similar nodes are connected by an edge, and classifying similar documents into clusters, a first index calculation step of calculating a first index indicating centrality of a document in the network, a second index calculation step of calculating a second index that is different from the first index in the network, and a display data generation step of generating, regarding a document, first display data indicating the network by an expression of a size of an object of a node according to the first index, an expression of a gauge having a shape corresponding to a shape of the object according to the second index and a length of the gauge, an expression according to a type of the cluster, and an expression according to magnitude of similarity between documents.

Further, the present invention is a cluster analysis system that classifies a plurality of documents into clusters according to content of the documents and generates display data indicating a relationship between documents. The cluster analysis system includes a similarity calculation unit that calculates similarity between content of one document and content of another document, a cluster classification unit that generates a network in which a document is set as a node based on calculated similarity and similar nodes are connected by an edge, and classifies similar documents into clusters, a first index calculation unit that calculates a first index indicating centrality of a document in the network, a second index calculation unit that calculates a second index that is different from the first index in the network and indicates importance of a document, and a display data generation unit that generates, regarding a document, first display data indicating the network by an expression of a size of an object of a node according to the first index, an expression of a gauge having a shape corresponding to a shape of the object according to the second index and a length of the gauge, an expression according to a type of the cluster, and an expression according to magnitude of similarity between documents.

Further, the present invention is a cluster analysis program that causes a computer to classify a plurality of documents into clusters according to content of the documents and generate display data indicating a relationship between documents, and to execute a similarity calculation step of calculating similarity between content of one document and content of another document, a cluster classification step of generating a network in which a document is set as a node based on calculated similarity and similar nodes are connected by an edge, and classifying similar documents into clusters, a first index calculation step of calculating a first index indicating centrality of a document in the network, a second index calculation step of calculating a second index that is different from the first index in the network, and a display data generation step of generating, regarding a document, first display data indicating the network by an expression of a size of an object of a node according to the first index, an expression of a gauge having a shape corresponding to a shape of the object according to the second index and a length of the gauge, an expression according to a type of the cluster, and an expression according to magnitude of similarity between documents.

Advantageous Effects of Invention

According to the present invention, it is possible to understand the gist of a large number of documents (particularly an immense number of documents) in a shorter time efficiently by enabling classification of a large number of documents, particularly an immense number of documents, into clusters including similar documents and a bird's eye view of a relationship between the documents.

BRIEF DESCRIPTION OF DRAWINGS

FIG. 2A, FIG. 2B, and FIG. 2C are each display example of part of a cluster analysis result displayed on an output unit of an information terminal.

DESCRIPTION OF EMBODIMENTS

Hereinafter, an embodiment of the present invention will be described with reference to the drawings.

Figure 1:
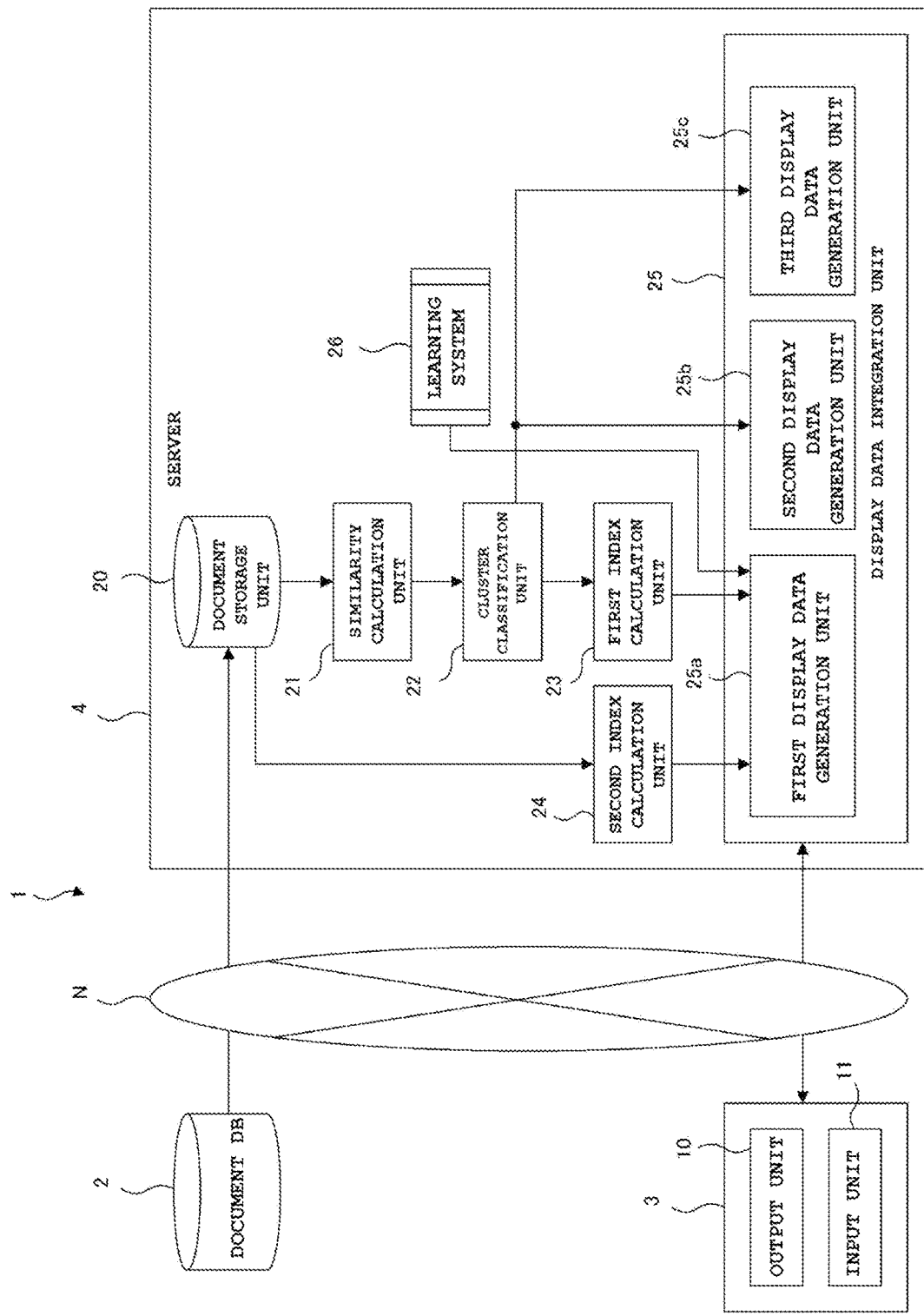
FIG. 1 is an overall configuration diagram of a cluster analysis system according to an embodiment of the present invention.

FIG. 1 is an overall configuration diagram illustrating a cluster analysis system according to the embodiment of the present invention, and a configuration of the present embodiment will be described based on the diagram.

As illustrated in FIG. 1, in a cluster analysis system 1 according to the present embodiment, a document database 2 (hereinafter, database is referred to as "DB"), an information terminal 3, and a server 4 are connected via a communication network N. The communication network N is, for example, the Internet, an intranet, a virtual private network (VPN), or the like, and is a communication network capable of bidirectionally transmitting information using a wired or wireless communication means. Further, in FIG. 1, one of the document DB 2 and one of the information terminals 3 are connected to one of the servers 4 for simplification of description. However, the server 4 can be connected to a plurality of document DBs and a plurality of the information terminals 3.

The document DB 2 is, for example, a database that stores information of documents such as academic papers, patent documents, journals, books, and newspaper articles, and discloses stored documents to a limited or non-limited person. In the present embodiment, the document DB 2 will be described as an example of a document DB that stores information of medical literature. However, content, fields, and types of documents that can be stored in the document DB of the present invention are not limited. In the present embodiment, the information of medical literature includes bibliographic matters such as an author name, a publication year, an affiliation of an author, a content matter of a paper such as a title, a gist, and a text of the paper, citing and cited information such as the number of citing and cited items and citing and cited document names, publication information such as an academic society name, a magazine name, or a publishing company name by which a document is published, and the like.

In the present description, "a document" includes "sentences", "sentences" include two or more of "a sentence", and "a sentence" includes two or more of "a word". In the present description, an "abstract" is sentences expressing an outline or a feature of one document arranged in advance at the beginning or the end of the document. In the present description, "summary" or "summary sentence" (either of which is referred to as "summary") is one or more of a sentence extracted from a certain target and expressing an outline or a feature of the target. Here, the target may be sentences, a document, or a cluster.

Further, the document DB 2 may be a website on a network accessible via the communication network N, and a document storage unit 20 can acquire text described in an accessible website as a document.

In a case of acquiring a website as a document, it is possible to acquire search results by a web search engine up to a predetermined number of items. For example, the top 500 websites can be acquired for a predetermined search inquiry.

The information terminal 3 is, for example, a personal computer (hereinafter referred to as "PC"), or a mobile terminal such as a smartphone, a tablet PC, or a mobile phone, and includes an output unit 10 and an input unit 11.

The output unit 10 is, for example, a device such as a display or a printer, and can display the display data generated by the server 4 in a visually recognizable manner.

The input unit 11 is, for example, a device such as a keyboard or a mouse, and allows input and operation of information. The output unit 10 and the input unit 11 may integrally constitute, for example, a touch panel.

A person (user) who uses the information terminal 3 can check the display data generated by the server 4 on the output unit 10 and can issue various instructions to the server 4 via the input unit 11.

The server 4 includes one or a plurality of servers (computers) that classify (cluster) a plurality of documents into clusters according to the content of the documents and generate display data indicating a relationship between each document. The server 4 includes various calculation units and storage units, and includes, for example, the document storage unit 20, a similarity calculation unit 21, a cluster classification unit 22, a first index calculation unit 23, a second index calculation unit 24, a display data integration unit 25 (display data generation unit), and a learning system 26.

Specifically, the document storage unit 20 is a storage unit that is connected to the document DB 2 via the communication network N and acquires and stores necessary information of a document from the document DB 2. For example, in the present embodiment, medical literature is acquired from the document DB 2 and stored. Further, the document storage unit 20 has a search function, and can acquire a population of documents to be classified into clusters by extracting a document including a specific keyword from stored documents or extracting a document specified by a date. The document storage unit 20 also has a function of automatically updating a document in the document storage unit 20 in synchronization with update such as addition or deletion of the document in the document DB 2.

The similarity calculation unit 21 has a function of calculating similarity between content of one document and content of another document for a population of documents stored in the document storage unit 20 or generated documents. For example, TF-IDF or cosine similarity can be used for calculation of the similarity. That is, the similarity calculation unit 21 extracts words used in content of each document, weights each word from a product of an appearance frequency (term frequency (TF)) in a document and rarity (inverse document frequency (IDF)) with respect to a word used in another document, and vectorizes the document. Then, the similarity calculation unit 21 calculates a value of cosine (cos) between vectorized documents as a value of similarity between the documents. The similarity is represented by a value between 0 and 1 in a manner, for example, the similarity between a first document and a second document is 0.856, the similarity between a first document and a third document is 0.732, and, the closer the similarity is to 1, the more similar the documents are.

The cluster classification unit 22 generates a network including the documents connected by a line (hereinafter referred to as "edge") based on the similarity calculated by the similarity calculation unit 21, and classifies similar documents into clusters. An algorithm for clustering is not particularly limited. For example, an algorithm (what is called the Girvan-Newman algorithm) that specifies a cluster in which connectivity between nodes is maintained as much as possible by iterative calculation even when an edge is separated can be used.

The first index calculation unit 23 has a function of calculating a first index indicating the centrality of each document in a network generated by the cluster classification unit 22. An algorithm for calculating the centrality is not particularly limited. For example, eigenvector centrality, PageRank, betweenness centrality, degree centrality, and the like can be used. In the present embodiment, eigenvector centrality is used. The eigenvector centrality for one document (hereinafter referred to as "node") on a network is indicated by a probability of passing through any node in the network when following an edge is repeated starting from the node.

The second index calculation unit 24 has a function of calculating a second index different from the first index for each document from the document storage unit 20. The second index is, for example, what is called an impact factor calculated according to the number of cited items based on the citing and cited information, a rank of an academic society or the like in which a document based on the publication information is published, or the like. As described above, the second index may be an index indicating the absolute importance of a document regardless of the network. For example, according to the description published on the website (https://clarivate.jp/products/journal-citation-reports/impact-factor/) of Clarivate company, in order to quantify and evaluate the influence degree of a journal (academic journal) in which the document is published, the impact factor is calculated by dividing the total value (=the total influence degree of a paper group) of the number of times all the papers published by a journal are cited by the number of published papers. Note that the second index may be individually given with respect to the importance indicated by the document, and may be calculated on the basis of the citation information of the document, for example.

The citation information for calculating the second index can be acquired with reference to information included in a document. Further, a known index such as an impact factor may be obtained from another information source on the basis of information of an academic journal on which a document is published.

Further, in a case where the document is not an academic paper but a website, the number of accesses to the website or the like can be used as an index indicating the importance of the document as the second index.

The display data integration unit 25 has a function of generating various types of display data related to each document, and includes a first display data generation unit 25a, a second display data generation unit 25b, and a third display data generation unit 25c according to the display data.

Figure 2B:

Each of FIG. 2A, FIG. 2B, and FIG. 2C is a display example of a cluster analysis result displayed on an output unit of an information terminal. As illustrated in the diagram, the display data shown in FIG. 2A is part of first display data, the display data shown in FIG. 2B is second display data, and the display data shown in FIG. 2C is third display data.

The first display data generation unit 25a has a function of generating, for each document, the first display data indicating the network by an expression according to the first index, an expression according to the second index, an expression according to a type of a cluster, and an expression according to the magnitude of the similarity between documents.

Figure 3:
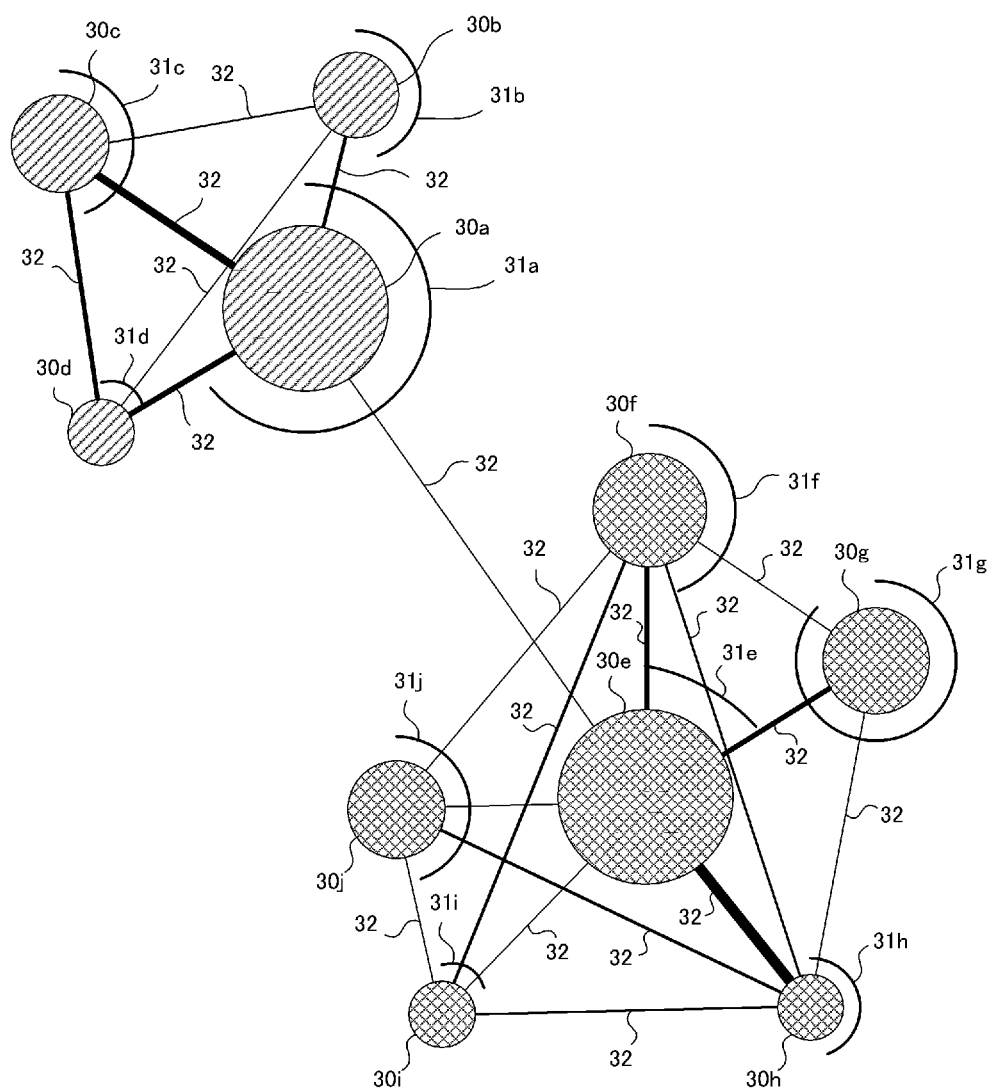
FIG. 3 is an explanatory diagram of first display data.

Specifically, as illustrated in FIG. 3, the first display data generation unit 25a indicates one document (hereinafter, referred to as "node") on the network by one circle, expresses the first index by the size of the circle, expresses a type of a cluster by a color, and expresses the magnitude of the similarity by the thickness of an edge. Further, the first display data generation unit 25a expresses the second index by a length of an arc.

Note that the node is not limited to a node including only one document, and may be a node including a plurality of documents. For example, one node may be a node in which a plurality of documents having high similarity are merged.

Note that the object representing the shape of the node is not limited to a circle, and may be, for example, a polygon such as a triangle, a quadrangle, or a pentagon, a shape similar to a circle such as an ellipse, or a shape often used as a mark such as a heart shape or a star shape. The degree of the first index may be expressed by the size of the object.

The degree of the second index may be expressed by a gauge disposed outside the object representing the node and a length of the gauge. Preferably, the degree of the second index can be expressed by the gauge corresponding to the object shape and the length of the gauge. For example, in a case where the object representing the node is a circle, the shape of the gauge corresponding to the shape of the circle is an arc, and the gauge can represent the second index by the length of the arc as described above. The length of the arc that is the gauge in this case can be expressed in a manner that, for example, with reference to a node having a maximum value of the second index among nodes in a network, the representation of the gauge of the second index of the node having the maximum value is a circle, and the representation of the gauge of a node having the second index smaller than the maximum value is the length of the arc according to the degree of the second index.

In FIG. 3, ten nodes 30a to 30j (hereinafter also collectively referred to as "nodes 30") are displayed, four of the nodes 30a to 30d on the upper left belong to a first cluster, and six of the nodes 30e to 30j on the lower right belong to a second cluster. Note that the first cluster and the second cluster are indicated by different colors in the first range A. However, in FIG. 3, the difference in color is indicated by a difference in hatching.

The size of the node 30 indicates the degree of the centrality, and in FIG. 3, it can be seen that the node 30a and the node 30e are larger than the other nodes and are documents with higher centrality. Further, at the nodes 30, the second index (for example, impact factor) is indicated by the length of a concentric arc 31. Therefore, in FIG. 3, since the arc 31a of the node 30a and the arc 31g of the node 30g are relatively long arcs, the documents of these are shown to have a larger impact factor.

Further, the thickness of an edge 32 connecting the nodes 30 indicates the magnitude of the similarity between the documents connected by the edge 32. Therefore, in FIG. 3, since the edges 32 between the node 30a and the node 30c and between the node 30e and the node 30h are relatively thick, the similarity between these nodes is shown to be higher.

Furthermore, the first display data generation unit 25a can perform enlarged display and reduced display of the network, and generates the first display data by increasing or decreasing the number of edges to be displayed according to the enlarged display and the reduced display. For example, the first display data generation unit 25a sets a threshold value whose value increases as the display is reduced more, and displays only edges whose similarity is equal to or more than the threshold value. In this manner, as the display of the network is reduced more, the number of nodes to be displayed increases, while the number of edges to be connected to one node decreases.

Furthermore, at the time of enlarged display and reduced display of the network, a plurality of adjacent nodes having high similarity may be displayed in a merged manner. In this manner, even when the network is displayed in a reduced manner, it is possible to display the network without increasing the number of nodes.

Further, the first display data generation unit 25a determines the position and interval of each node, that is, the length of the edge, using a drawing algorithm based on a dynamic model. For example, the first display data generation unit 25a draws nodes in a manner that an attractive force is applied to a node to which a large number of edges are connected and a node directly connected to the node to form an island in which the nodes are put together closely. In contrast, a repulsive force is generated between islands, so that the islands are drawn to be arranged at positions away from each other. As the position and interval of each node are determined using such a dynamic model, the nodes are arranged at appropriate intervals without overlapping.

Furthermore, the first display data generation unit 25a displays a color of each cluster and a summary of the cluster as a legend as illustrated in the "LEGEND" of FIG. 2A. Specifically, for example, the first display data generation unit 25a decomposes a document in the same cluster into sentences constituting items (position of research, background of research, problems of prior research, purpose of research, contribution of research, significance of research, and the like) in medical literature, and extracts sentences constituting one or a plurality of specific items (purpose of research, significance of research) as a summary element. Then, the first display data generation unit 25a creates a summary on the basis of the extracted summary element. The processing of decomposing documents into items may use AI obtained by machine learning processing of decomposing documents into items. Further, in the processing of creating a summary on the basis of a summary element, AI for creating a summary on the basis of a summary element may be used.

Further, in a case where the document is a website, a summary may be created based on text published on the website. Since there is a case where a website is a collection of a plurality of documents, one website including a plurality of documents may be treated as one collective node.

The second display data generation unit 25b has a function of extracting a word having a high appearance frequency included in at least one of the titles, the gist, and the text of a document belonging to one cluster and generating the second display data for displaying the word in a size corresponding to the appearance frequency. Specifically, as illustrated in FIG. 2B, a word that more frequently appears in one cluster designated in the first range A is expressed in a larger font in a circular frame. For example, in FIG. 2B, the letters "clinical" is shown in the largest size, and "Vedolizumab", "infliximab", "remission", "endoscopic", and "Cohort" are shown in next larger sizes. Each word may be arranged in any positional relationship such as a horizontal direction or a vertical direction so as not to overlap with other words.

The third display data generation unit 25c has a function of extracting a word having a high appearance frequency included in at least one of the titles, the gist, and the text of a document belonging to one cluster and generating the third display data for displaying the word in order corresponding to the appearance frequency. That is, the third display data generation unit 25c displays the words that frequently appear in the designated one cluster also extracted in the second display data generation unit 25b according to the appearance frequency (as what is called ranking display). For example, in FIG. 2C, "clinical" is disposed at the top, and "Vedolizumab", "infliximab", "remission", "endoscopic", and "Cohort" are subsequently disposed below "clinical". Furthermore, the third display data generation unit 25c can also include, in the display data, a use rate of a word in a document in the designated cluster, such as "clinical 100%" and "Vedolizumab 88%".

Further, the similarity calculation unit 21 and the cluster classification unit 22 have a function of excluding a document including a specific word such as an extracted word having a high appearance frequency from analysis, outputting an analysis result of analysis performed again, and reflecting the analysis result in the first display data, the second display data, and the third display data.

Further, the similarity calculation unit 21 and the cluster classification unit 22 have a function of highlighting, on the network indicated by the first display data, a node indicating a document including a specific word such as an extracted word having a high appearance frequency.

As a method of emphasizing a node, it is possible to display that the selected word is included by various methods such as changing a color of the node or adding a visual effect.

The display data integration unit 25 generates display data obtained by integrating pieces of the display data generated by the first display data generation unit 25a, the second display data generation unit 25b, and the third display data generation unit 25c on one screen, and transmits the display data to the information terminal 3 connected to the server 4 via the communication network N.

The learning system 26 has a function of supplying AI that decomposes documents in the first display data generation unit 25a described above into items and AI that creates a summary on the basis of a summary element. Specifically, the learning system 26 performs machine learning (for example, deep learning or a neural network) using data of a document in which each item is known in advance as learning data (teaching data) to generate AI (learned model) that decomposes a document into items that are constituents of the document. Machine learning (for example, deep learning or a neural network) is performed using a summary using a summary element as learning data in advance, so that AI (learned model) that creates a summary on the basis of a summary element is generated.

In the cluster analysis system 1 configured as described above, for example, when the user inputs information such as a specific disease name to the server 4 via the input unit 11 of the information terminal 3, each piece of display data as illustrated in FIG. 2A, FIG. 2B, and FIG. 2C corresponding to the input information is output from the server 4 to the output unit 10 of the information terminal 3.

Figure 4:
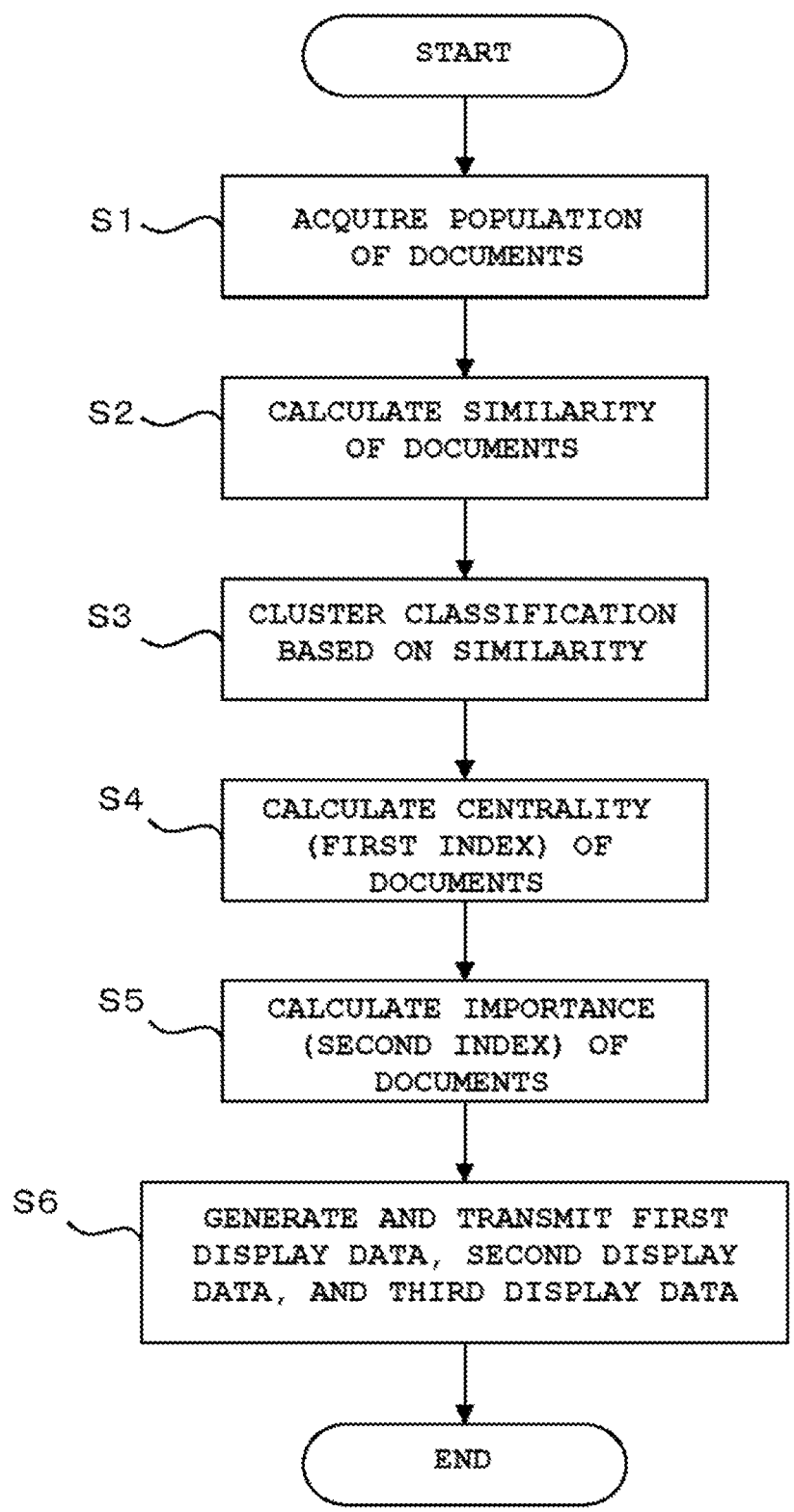
FIG. 4 is a flowchart showing a cluster analysis control routine executed by a server of the cluster analysis system according to the embodiment of the present invention.

FIG. 4 is a flowchart of a cluster analysis control routine executed by the server 4 of the cluster analysis system 1. Hereinafter, the cluster analysis method of the present embodiment will be described in detail along the flowchart.

Upon receiving input information such as a specific disease name from the information terminal 3, the server 4 acquires a population of documents corresponding to the input information from the document storage unit 20 in Step S1.

In subsequent Step S2, the similarity calculation unit 21 calculates similarity between documents constituting the population.

Further, in Step S3, the cluster classification unit 22 generates a network between documents on the basis of the similarity calculated in Step S2, and classifies a set of similar documents so as to constitute a cluster.

In Step S4, the first index calculation unit 23 calculates the first index indicating the centrality of the documents in the network generated in Step S3.

In Step S5, the second index calculation unit 24 calculates the second index. The second index is, for example, an impact factor of a journal.

In Step S6, the first display data generation unit 25a generates the first display data, the second display data generation unit 25b generates the second display data, and the third display data generation unit 25c generates the third display data, and the display data integration unit 25 generates display data obtained by integrating these pieces of display data. Then, the display data integration unit 25 transmits the integrated display data to the information terminal 3, and ends the routine.

Figure 5:
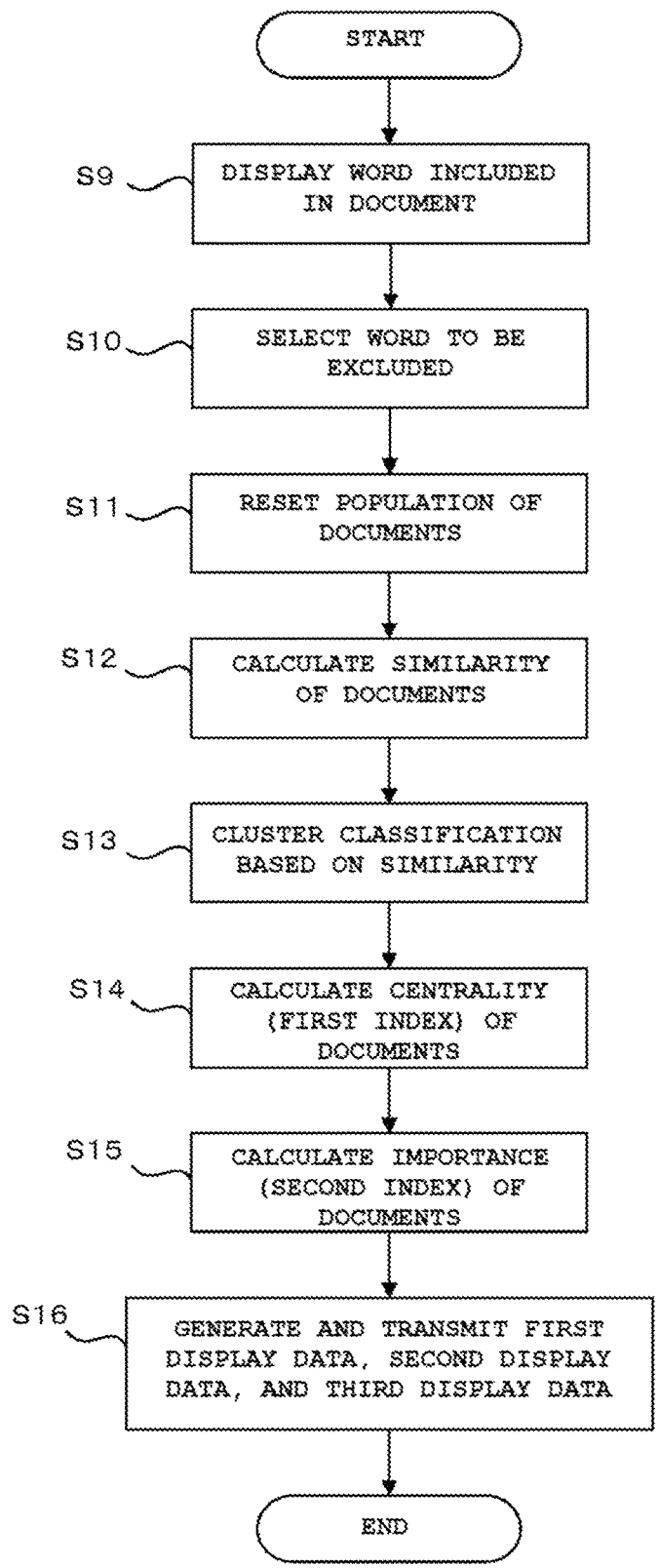
FIG. 5 is a flowchart showing the cluster analysis control routine executed by a server of the cluster analysis system according to the embodiment of the present invention.

FIG. 5 is a flowchart of the cluster analysis control routine executed by the server 4 of the cluster analysis system 1 in a case where reanalysis is performed excluding a specific word. Note that description of the same process as described above is omitted.

In Step S9, the server 4 displays, on the output unit 10 or the like of the information terminal 3, a candidate of a word included in a document to be excluded from a population of documents, such as a word with a high appearance frequency included in the third display data.

In Step S10, the user inputs or selects a word to be excluded using the input unit 11 and the like of the information terminal 3. The server 4 receives input or selection of a word.

In Step S11, when a word to be excluded is selected in Step S10, a population of documents excluding a document including the word to be excluded is acquired. Since the process of the processing in Steps S12 to S16 that follow is similar to the process of the processing in Steps S2 to S6 described above, description will be omitted.

As described above, in the cluster analysis system 1 according to the present embodiment, a network is formed on the basis of the similarity between documents only by natural language processing for the content of the documents, a cluster of similar documents is formed, and the first display data indicating the network is generated by the expression according to the first index indicating the centrality, the expression according to a type of the cluster, and the expression according to the magnitude of the similarity, so that it is possible to grasp from the information of each document to the relevance between the documents as one display. That is, since the network of the first display data of the present embodiment is formed without using the citing and cited information of documents, and only on the basis of the content of documents excluding the citing and cited information of the documents, it is possible to form a cluster according to the similarity of the content of the documents.

Furthermore, by indicating the second index such as an impact factor different from the first index based on the content of a document together with the first display data, it is possible to easily and multidimensionally grasp the position and importance of the document.

Further, in the first display data, the first index is expressed by the size of an object of a node indicating a document, and the second index is expressed according to the gauge having a shape corresponding to the shape of the object and the length of the gauge, so that the centrality and the importance of the document can be intuitively grasped at the same time.

Further, by excluding a document including a word designated from words having a high appearance frequency included in documents from targets of analysis and performing analysis again, it is possible to extract and grasp a document of higher interest by excluding a document of low interest that has a high appearance frequency.

Further, by highlighting, in a network, a node indicating a document including a word designated from words with a high appearance frequency included in documents, it is possible to grasp where a document including a word of interest is located on the network.

Further, in the first display data, the arrangement of each document on a network is determined using a dynamic model so that a plurality of documents are not shown in an overlapping manner, so that the visibility can be improved.

Furthermore, in the first display data, enlarged display and reduced display of a network can be performed, and the number of edges to be displayed is increased or decreased according to the enlarged display and the reduced display. In this manner, it is possible to prevent edges from being displayed in a complicated manner according to the enlarged display and the reduced display of a network and to improve the readability. Further, in the above manner, an information amount is optimized according to the enlarged display and the reduced display of a network, so that it is possible to reduce the processing load of the server 4 and an information amount to the information terminal 3, and it is possible to smoothly change the display.

Further, by extracting words having a high appearance frequency included in documents belonging to a cluster, and generating the second display data for displaying the words with a size according to the appearance frequency and the third display data for displaying the words in order according to the appearance frequency together with the first display data, it is possible to grasp the content of each cluster more easily. In particular, in the second display data and the third display data, the appearance frequency is extracted for at least one of the title, the gist, and the text of a document, so that, for example, it is possible to extract the appearance frequency even for a document from which only the title and the gist can be acquired or a document having only the text without the title or the gist, and it is possible to extract a word more appropriate for representing a cluster.

As described above, according to the present embodiment, it is possible to understand the gist of a large number of documents in a shorter time efficiently by enabling classification of a large number of documents, particularly an immense number of documents, into clusters including similar documents and a bird's eye view of a relationship between the documents.

Although an embodiment of the present invention is specifically described above, it is to be understood that the present invention is not limited to the embodiment, and various changes and modifications in the embodiment can be made by those skilled in the art without departing from the scope or spirit of the present invention as defined in the appended claims.

In the above embodiment, as illustrated in FIG. 3, the first display data generation unit 25a expresses the first index by the size of a circle and expresses the second index by the length of an arc. The expressions of the first index and the second index are not limited to the above, and, for example, can be indicated as double concentric circles in which the first index indicated by one color is arranged on the inner side and the second index indicated by another color is arranged on the outer side.

Further, in the above embodiment, TF-IDF and cosine similarity are used for calculating similarity, the Girvan-Newman algorithm is used as an algorithm for clustering, and eigenvector centrality is used as an algorithm for calculating centrality. The calculation methods of the similarity, the clustering, and the centrality are not limited to these algorithms, and, for example, other algorithms may be used, or the similarity, the clustering, and the centrality may be collectively processed using one algorithm.

REFERENCE SIGNS LIST

1 Cluster analysis system
2 Document DB
3 Information terminal
4 Server
10 Output unit
11 Input unit
20 Document storage unit
21 Similarity calculation unit
22 Cluster classification unit
23 First index calculation unit
24 Second index calculation unit
25 Display data integration unit (display data generation unit)
25a First display data generation unit
25b Second display data generation unit
25c Third display data generation unit
Learning system
30(30a to 30j) Node
31(31a to 31j) Arc
N Communication network
A First range
B Second range
C Third range
a Fourth range

The invention claimed is:

1. A cluster analysis method in which a computer classifies a plurality of documents into clusters according to content of the documents and generates display data indicating a relationship between documents, the cluster analysis method comprising:
calculating similarity between content of a document and content of another document;
generating a network in which the document or a cluster is set as a node based on calculated similarity and similar nodes are connected by an edge, and classifying similar documents into clusters;
calculating, by an algorithm, a first index indicating centrality of the document in the network;
calculating a second index, calculated according to a citation of the document, that is different from the first index in the network and indicates an impact factor of the document; and
generating display data,
wherein, regarding the document, the generated display data includes first display data indicating the network by an expression of a size of an object of a node according to the first index, an expression of a gauge having a shape corresponding to a shape of the object according to the second index and a length of the gauge, an expression according to a type of the cluster, and an expression according to magnitude of similarity between documents,
wherein the display data is generated using a dynamic model so that the node and each of the similar nodes are arranged at appropriate intervals without overlapping; and
storing the model in the computer memory, and
wherein the display data in which an object of the first index is represented by a circle, and a gauge of the second index is represented by an arc concentric with the circle of the first index and a length of the arc.

2. The cluster analysis method according to claim 1, wherein
the document has at least one of a title, a gist, and a text as a constituent thereof, and
the generating display data further comprises:
extracting a word having a high appearance frequency included in at least one of a title, a gist, and a text of a document belonging to one cluster, and
generating second display data for displaying the word in a size according to the appearance frequency.

3. The cluster analysis method according to claim 1, wherein
the document has at least one of a title, a gist, and a text as a constituent thereof, and
the generating display data further comprises:
extracting words having a high appearance frequency included in at least one material selected from the group consisting of a title, a gist, and a text of a document belonging to one cluster, and
generating second display data for displaying the words in order according to the appearance frequency.

4. The cluster analysis method according to claim 1, wherein the document is published on an academic journal.

5. The cluster analysis method according to claim 1, wherein the document is described on a website acquired by web search up to a predetermined number of items.

6. The cluster analysis method according to claim 5, wherein the second index is calculated according to a number of accesses to the website.

7. The cluster analysis method according to claim 5, wherein
a word with a high appearance frequency included in the document is extracted, and
second display data for displaying the word in a size according to the appearance frequency is generated.

8. The cluster analysis method according to claim 5, wherein
words with a high appearance frequency included in the document are extracted, and
second display data for displaying the words in order according to the appearance frequency is generated.

9. The cluster analysis method according to claim 1, further comprising:

designating a word from those having a high appearance frequency included in the document;
excluding the document including the designated word from the target of analysis; and
performing the analysis again.

10. The cluster analysis method according to claim 1, further comprising:
designating a word from those having a high appearance frequency included in the document;
wherein each of the nodes indicates a respective document or a cluster including the designated word.

11. The cluster analysis method according to claim 1, wherein the generating of the display data comprises determining an arrangement of documents on the network by using the dynamic model so that a plurality of documents are not displayed in an overlapping manner.

12. The cluster analysis method according to claim 1, wherein the generating of the display data comprises:
expressing an expression according to magnitude of similarity between the documents by thickness of a line connecting documents and displaying the network in an enlarged and or a reduced manner, and
generating the first display data by increasing or decreasing a number of displayed lines according to the enlarged or reduced display.

13. A cluster analysis system that classifies a plurality of documents into clusters according to content of the documents and generates display data indicating a relationship between the documents, the cluster analysis system comprising:
a storage memory; and
a processor, comprising:
a similarity calculation unit that calculates similarity between content of a document and content of another document;
a cluster classification unit that generates a network in which the document is set as a node based on calculated similarity and similar nodes are connected by an edge, and classifies similar documents into clusters;
a first index calculation unit that calculates a first index indicating centrality of the document in the network;
a second index calculation unit that calculates a second index, calculated according to a citation of the document, that is different from the first index in the network and indicates an impact factor of the document; and
a display data generation unit that generates, regarding the document, first display data indicating the network by an expression of a size of an object of a node according to the first index, an expression of a gauge having a shape corresponding to a shape of the object according to the second index and a length of the gauge, an expression according to a type of the cluster, and an expression according to magnitude of similarity between documents,
wherein the display data is generated using a dynamic model so that the node and each of the similar nodes are arranged at appropriate intervals without overlapping, and
wherein the dynamic model is stored in the storage memory.

14. A non-transitory computer-readable medium having stored thereon computer-executable instructions for cluster analysis program that, upon execution, causes a computer to classify a plurality of documents into clusters according to content of the documents and generate display data indicating a relationship between documents, the computer-executable instructions including:
calculating similarity between content of one document and content of another document;
generating a network in which a document is set as a node based on calculated similarity and similar nodes are connected by an edge, and classifying similar documents into clusters;
calculating a first index indicating centrality of a document in the network;
calculating a second index, according to a citation of the document, that is different from the first index in the network and indicates an impact of a document regardless of the network to which the classified similar document correspond; and
generating, regarding the document, first display data indicating the network by an expression of a size of an object of a node according to the first index, an expression of a gauge having a shape corresponding to a shape of the object according to the second index and a length of the gauge, an expression according to a type of the cluster, and an expression according to magnitude of similarity between documents,
wherein the display data is generated using a dynamic model so that the node and each of the similar nodes are arranged at appropriate intervals without overlapping, and
wherein the dynamic model is stored in a memory of the computer.

15. The cluster analysis method according to claim 1, wherein the length of the arc comprise a reference to a node having a maximum value of the second index and a representation of the gauge of the second index of the node having the maximum value is a circle, and the representation of the gauge of a node having the second index smaller than the maximum value is the length of the arc according to the degree of the second index.

* * * * *